United States Patent Office 3,329,685
Patented July 4, 1967

3,329,685
DERIVATIVES OF 3-DIPHENYLMETHYL-PYRAZOLE
Karl Schulte and Volker Koppe, Darmstadt, Hans Friebel, Darmstadt-Eberstadt, and Siegmund Sommer, Darmstadt, Germany, assignors to E. Merck Aktiengesellschaft, Darmstadt, Germany
No Drawing. Filed Apr. 7, 1964, Ser. No. 358,061
Claims priority, application Germany, Apr. 9, 1963, M 56,427, M 56,428
19 Claims. (Cl. 260—310)

An excellent laxative effect has been found in pyrazole derivatives of the general Formula I—

Formula I

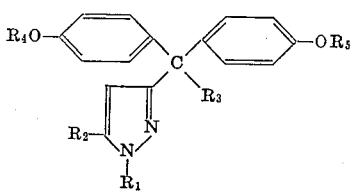

wherein $R_1$, $R_2$ and $R_3$ are either the same or different and represent H or alkyl groups with up to 4 carbon atoms,
$R_4$ and $R_5$ are either the same or different and represent H, lower alkyl group (preferably $CH_3$ or $C_2H_5$) or lower acyl groups (preferably acetyl) and the benzene nuclei can be substituted in one or more places with alkyl groups having up to 4 carbon atoms.

The new pyrazole derivatives are practically nontoxic and exert a specific effect on the large intestine. The compounds were tested by the method of L. Schmidt, Arzneimittelforschung, vol. 3, page 19 (1953). The following compounds are especially effective: 1,5-dimethyl-3-(p,p'-diacetoxy-diphenylmethyl)-pyrazole, 1-methyl-3-(p,p'-diacetoxy-diphenylmethyl)-5-ethyl-pyrazole and 1-ethyl-3-(p,p'-diacetoxy-diphenylmethyl)-5-methyl-pyrazole.

A principal object of this invention, therefore, is to provide such novel pyrazole derivatives.
A further object is to provide pharmaceutical compositions based on such novel compounds.
An additional object is to provide methods of administering said compounds to effect laxative activity.
A still further object is to provide processes for the production of these novel derivatives.

Upon further study of the specification and claims other objects and advantages of the present invention will become apparent.

To attain these objects, the novel pyrazole derivatives can be prepared by any of the following methods:

A pyrazole of Formula II

Formula II

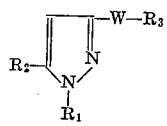

wherein

W is a carbonyl group which can be functionally altered, or can be $>CX_2$ or

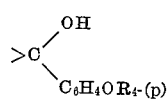

where the benzene nucleus ($C_6H_4$) can be further substituted by one or more alkyl groups with up to 4 carbon atoms, X is Cl, Br or I, and $R_1$ to $R_4$ have the meanings given above, is condensed with a phenol derivative of Formula III Formula III

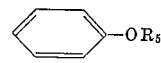

wherein $R_5$ has the previously indicated meaning and the benzene nucleus can be further substituted by one or more alkyl groups with up to 4 carbon atoms.

Another method is to treat a pyrazole derivative of Formula IV

Formula IV

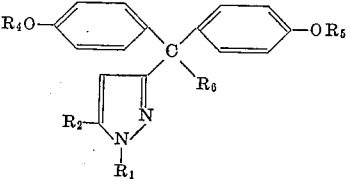

wherein $R_6$ is OH or an alkynyl or alkenyl group with up to 4 carbon atoms,
$R_1$, $R_2$, $R_4$ and $R_5$ have the previously indicated meanings, and the benzene nuclei can be further substituted by one or more alkyl groups with up to 4 carbon atoms, with hydrogenating agents.

Still another method is to diazotize a pyrazole derivative of Formula V

Formula V

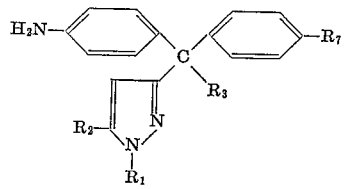

wherein $R_7$ is $NH_2$ or $OR_4$
$R_1$ to $R_4$ have the meanings given above, and the benzene nuclei can be further substituted by one or more alkyl groups with up to 4 carbon atoms, and then to decompose the diazo compound, and if necessary to acylate or etherify a hydroxyl group in the benzene nuclei of the pyrazole derivative of Formula I, or to set free an acetylated or etherified hydroxyl group in the benzene nuclei, and/or if desirable, to substitute a hydrogen atom in the 1-position on a pyrazole ring by an alkyl group with up to 4 carbon atoms.

The process of this invention can be commenced with pyrazole compounds of Formula II. The following compounds are particularly suitable for this procedure:

3-formyl-1,5-dimethyl-pyrazole
5-ethyl-3-formyl-1-methyl-pyrazole
1,5-diethyl-3-formyl-pyrazole
1-ethyl-3-formyl-5-methyl-pyrazole
1-isobutyl-3-formyl-5-methyl-pyrazole
(1-methyl-5-ethyl-pyrazole-3)-ethyl-ketone
(1-ethyl-5-methyl-pyrazole-3)-butyl-ketone
(1,5-diethyl-pyrazole-3)-methyl-ketone or the corresponding compounds with functionally altered C=O groups, e.g. bisulfite addition compounds, acetals, thioacetals, ketals, thioketals, or the semicarbazones, oximes, hydrazones, azines and other compounds of Formula II in which the original carbonyl group is conlensed with an amino compound. In addition, it is preferred to employ the following compounds:

3-dichloromethyl-pyrazole,
1,5-dimethyl-3-dichloromethyl-pyrazole,
1-methyl-5-ethyl-3-dichloromethyl-pyrazole,
1,5-diethyl-3-dibromomethyl-pyrazole,
1-ethyl-3-(1,1-dichloro-n-butyl)-5-methyl-pyrazole,
1-ethyl-3-(1,1-dibromo-n-pentyl)-5-isobutyl-pyrazole,
1-isobutyl-3-(1,1-dichloro-n-propyl)-5-methyl-pyrazole, as well as (1,5-dimethyl-pyrazolyl-3)-p-hydroxyphenyl-carbinol,
(1,5-dimethyl-pyrazolyl-3)-p-methoxyphenyl-carbinol,
(1,5-dimethyl-pyrazolyl-3)-p-acetoxyphenyl-carbinol,
(1-methyl-5-ethyl-pyrazolyl-3)-(3-methyl-4-acetoxyphenyl)-carbinol,
(1-methyl-5-ethyl-pyrazolyl-3)-p-acetoxyphenyl-carbinol,
(1,5-diethyl-pyrazolyl-3)-p-acetoxyphenyl-carbinol,
(1-ethyl-5-isobutyl-pyrazolyl-3)-p-acetoxyphenyl-carbinol,
(1-ethyl-5-methyl-pyrazolyl-3)-(2-methyl-4-acetoxyphenyl)-carbinol,
(1-ethyl-5-methyl-pyrazolyl-3)-(3-methyl-4-acetoxy-5-tert. butyl-phenyl)-carbinol,
(1,5-dimethyl-pyrazolyl-3)-p-ethoxyphenyl-carbinol.

The pyrazole compounds of Formula II are reacted with phenol derivatives of Formula III, namely the corresponding phenols, phenol ethers or phenol esters. The phenol derivatives can be substituted in the nucleus in one or more places in ortho or meta position to an $OR_5$ group by alkyl groups with up to 4 carbon atoms, e.g. methyl, ethyl, propyl, isobutyl, or tert. butyl groups. Besides phenol itself, the following phenol derivatives are also suitable for such reaction: phenyl acetate, anisole, phenetol, phenyl isopropyl ether, 3-methyl-phenol, 2-methyl-phenol, (3-methyl-phenyl)-acetic-acid ester, (2-methyl-phenyl)-acetic-acid ester, 2-methyl-anisole, 2-methyl-5-tert. butyl-phenol, 2,5-dimethyl-phenyl-acetic acid ester, (2-methyl-5-tert. butyl-phenyl)-acetic-acid ester and (2-methyl-5-ethyl-phenyl)-propionic-acid ester.

The pyrazole derivatives I are obtained from compounds II and III by splitting off water or hydrogen halide. It is advantageous to perform the reaction in the presence of a dehydrating agent, e.g. sulfuric acid, phosphoric acid, hydrochloric acid, or a Lewis-acid such as zinc chloride, stannic chloride, boron trifluoride, aluminum chloride or ferric chloride, or a phosphorus halide. The reaction can also be performed with suitable catalysts. The reaction will occur at room temperature or at somewhat lower temperatures. If necessary the reaction can be accelerated by moderate warming, especially during condensation with the separation of hydrogen halide, the mixture being preferably stirred during this process. It is sometimes advantageous to work in the presence of an inert gas such as nitrogen. A solvent is not absolutely necessary but is often advantageous. Such inert solvents as glacial acetic acid can be used, or a hydrocarbon such as benzene or toluene, or a halogenated hydrocarbon such as carbon tetrachloride. If necessary the condensation product thus obtained can be recrystallized from a suitable solvent such as alcohol or aqueous alcohol. In some cases the acyloxy groups on the benzene nucleus can be saponified during the condensation reaction.

If for a starting substance compounds of Formula II are used in which W represents the p-benzene residue $>COH-C_6H_4-OR_4$, then by reaction with phenol derivatives of Formula III, end products can be produced with variously substituted benzene nuclei. For example, by condensation of (1,5-dimethyl-pyrazole-3)-p-methoxyphenyl-carbinol with phenol, 1,5-dimethyl-3-(p-hydroxy-p'-methoxy-diphenyl-methyl)-pyrazole is produced.

By another procedure under this process, the pyrazole derivatives of Formula I are produced from the pyrazole derivatives of Formula IV by hydrogenation of the $R_6$ group. Suitable starting substances of Formula IV are the following:

(1,5-dimethyl-pyrazolyl-3)-p,p'-dihydroxydiphenyl-carbinol,
(1,5-diethyl-pyrazolyl-3)-p,p'-diacetoxydiphenyl-carbinol,
4-(1-ethyl-5-methyl-pyrazolyl-3)-3,3-bis(4-methoxy-3-methyl-phenyl)-butene-1,
(1,5-dimethyl-pyrazolyl-3)-di-(p-methoxyphenyl)-vinyl-methane,
(1-methyl-5-ethyl-pyrazolyl-3)-di-(p-methoxyphenyl)-ethinyl-methane.

The group $R_6$ can be reduced e.g. catalytically, or also chemically with zinc and glacial acetic acid, with hydriodic acid, with sodium in alcohol, or with sodium amalgam. For catalytic hydrogenation use is made of noble metal catalysts or catalysts of the nickel-cobalt-iron group, e.g. palladium black, platinum black, Raney-nickel, oxide catalysts such as palladium oxide, platinum oxide, or carrier-catalysts such as palladium/carbon, palladium/BaSO$_4$, palladium/CaCO$_3$, platinum/carbon, nickel/kieselguhr or nickel/pumice. The hydrogenation can be performed at room temperature and under normal pressure, but it is often advantageous to work under higher temperatures and pressures, preferably at 60° C. and under 6 atmospheres. The reaction is preferably performed in the presence of an inert solvent such as alcohol, but can also be performed without any solvent. In some cases the hydrogenation reaction is stopped after the calculated amount of hydrogen has been taken up.

For reduction by zinc and glacial acetic acid, the starting substance can be added to the reducing agents and the mixture heated. The starting substance can, however, be dissolved in the acid and the zinc added to the solution.

The following compounds can be used as starting substances of Formula V:

3-(p,p'-diamino-diphenyl-methyl)-pyrazole,
1,5-dimethyl-3-(p,p'-diamino-diphenyl-methyl)-pyrazole,
1,5-dimethyl-3-(p-amino-p'-hydroxy-diphenyl-methyl)-pyrazole,
1-methyl-3-(p,p'-diamino-diphenyl-methyl)-5-ethyl-pyrazole,
1,5-diethyl-3-(p-amino-p'-hydroxy-diphenyl-methyl)-pyrazole,
1-isopropyl-3-(p,p'-diamino-diphenyl-methyl)-5-methyl-pyrazole,
1-ethyl-3-(p,p'-diamino-diphenyl-methyl)-5-isobutyl-pyrazole,
1-ethyl-3-(3,3'-dimethyl-4,4'-diamino-diphenyl-methyl)-5-methyl-pyrazole,
1-(1-methyl-5-ethyl-pyrazolyl-3)-1,1-bis-(3-methyl-4-amino-5-tert. butyl-phenyl)-ethane,
1,5-dimethyl-3-(p-amino-p'-methoxy-disphenyl-methyl)-pyrazole,
1,5-dimethyl-3-(p-amino-p'-acetoxy-diphenyl-methyl)-pyrazole.

The diazotizing of compounds of Formula V is accomplished by e.g. reacting a solution of such a compound with nitrous acid or an acidic solution of a nitrite, e.g. a solution of sodium nitrite in sulfuric acid. During the diazotizing reaction the mixture is preferably cooled. By subsequent boiling of the diazonium salt solution and separation of the product in the usual manner, e.g. by neutralization with soda, the desired end product of Formula I is obtained.

In the pyrazole compound of Formula I thus obtained, the free hydroxyl groups on the benzene nuclei can be subsequently acylated or etherified. Thus, it is possible to react them with a reactive derivative of acetic acid such as acetyl chloride or acetic anhydride in the presence of pyridine or sodium acetate to acetylate them, or by analogy to introduce a propionic acid group by means of a suitable propionic acid derivative.

Free hydroxyl groups on the benzene nuclei can also be subsequently etherified by reaction with diazo-methane, dimethyl-sulfate, diethyl-sulfate, p-toluene-sulfonic acid methyl ester, or by the Williamson method.

If desired, the acylated or etherified hydroxyl groups on the benzene nuclei can be converted into free hydroxyl groups either by warming with alkaline substances such as sodium carbonate or potassium carbonate or by known methods of ether-splitting, e.g. by heating with pyridine hydrochloride.

Any hydrogen that is present in the $R_1$ group can be substituted by an alkyl group with 1 to 4 carbon atoms. For example, a pyrazole compound of Formula I with a hydrogen atom in the $R_1$ position can be converted into the corresponding alkali metal salt by reaction with a suitable alkali metal compound such as sodium alcoholate or sodium amide. The alkali metal salt can then have an alkyl residue with up to 4 carbon atoms introduced into it by reaction with a suitable alkali metal compound such as sodium alcoholate or sodium amide.

The starting substances for this process are to some extent known. For example, the production of 3-formyl-1,5-dimethylpyrazole by hydrogenation of 1,5-dimethyl-pyrazole-3-carboxylic acid chloride is described in Archiv der Pharmazie, vol. 264, page 343 (1926). By analogy starting substances of Formula II in which $R_3$ is hydrogen and W a carbonyl group can be obtained from the corresponding pyrazole-3-carboxylic acid chloride by hydrogenation with palladium.

Starting substances II in which $R_3$ is an alkyl group with up to 4 carbon atoms and W is a carbonyl group, can be obtained from the corresponding pyrazole-3-carboxylic acid chlorides by reaction with metallized malonic acid derivatives which can on occasions be substituted by alkyl groups, and can be subsequently saponified and decarboxylated.

Starting substances II can also be obtained by conversion of the acid chlorides into the corresponding pyrazole-3-carboxylic acid amides which are then dehydrated to the corresponding 3-cyano-pyrazoles and the latter reacted with alkyl-magnesium halides.

Starting substances of Formula II in which $R_3$ is an alkyl group with up to 4 carbon atoms and W is $CX_2$, can be produced by condensation of the corresponding 1,1-dihalogen-2,4-diketo compounds, e.g. 1,1-dichloro-acetyl-acetone, with hydrazines.

Starting substances of Formula II in which W is a p-benzene residue of Formula $>COH—C_6H_4—OR_4$ can be obtained from corresponding pyrazole-3-carboxylic acid chlorides by the Friedel-Crafts condensation with phenol or a corresponding phenol derivative, with subsequent reduction of the carbonyl group.

Starting substances of Formula IV can be produced e.g. by condensation of (pyrazolyl-3)-aryl-alkynyl- or -alkenyl-carbinols with the corresponding phenols or phenol derivatives. For example (1,5-dimethyl-pyrazole-3)-p-methoxy-phenyl-ethynyl-carboniol (obtained from 1,5-dimethyl-pyrazolyl-3-p-methoxy-phenyl-ketone and lithium-ethynyl) can be reacted with phenol to produce (1,5-dimethyl-pyrazolyl-3)-p - methoxy - phenyl - p - hydroxy - phenyl-ethynyl-methane.

The starting substances of Formula V in which $R_7$ is $NH_2$ and $R_3$ is H can be obtained by condensation of the corresponding 1,5-disubstituted 3-formyl-pyrazole with the corresponding aromatic amines with the help of dehydrating agents.

In the final products of Formula I the substituents can for example be as follows—

$R_1$, $R_2$ and $R_3$ can be hydrogen, methyl, ethyl, n-propyl, isopropyl, n-butyl, isobutyl or tert. butyl;

$R_4$ and $R_5$ can be hydrogen, methyl, ethyl, propyl, butyl, formyl, acetyl, propionyl or butyryl, wherein the methyl, ethyl, and acetyl groups are preferred.

The phenyl groups of compound I can be further substituted in one or more places by e.g. the following alkyl groups: methyl, ethyl, n-propyl, isopropyl, n-butyl, isobuytl, or tert. butyl.

By the process of this invention compounds of the following formulae are preferably produced.

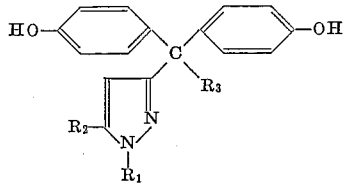

wherein $R_1$, $R_2$ and $R_3$ can be the same or different and represent H or alkyl groups with up to 4 carbon atoms, and where the benzene nuclei can be further substituted in one or more places by alkyl groups with up to 4 carbon atoms;

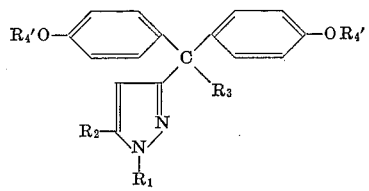

wherein $R_1$, $R_2$ and $R_3$ are the same or different and represent H or alkyl groups with up to 4 carbon atoms, $R_4'$ a lower acyl, preferably acetyl, and the benzene nuclei can be further substituted in one or more places by alkyl groups with up to 4 carbon atoms;

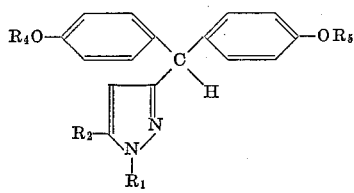

wherein $R_1$ and $R_2$ are the same or different and represent H or alkyl groups with up to 4 carbon atoms, $R_4$ and $R_5$ are the same or different and represent H, a lower alkyl group, preferably $CH_3$ or $C_2H_5$, or a lower acyl group, preferably acetyl, and the benzene nuclei can be further substituted in one or more places by alkyl groups with up to 4 carbon atoms;

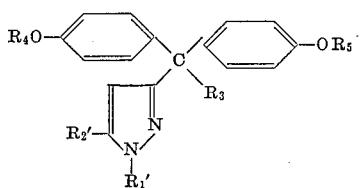

wherein $R'_1$ is $CH_3$ or $C_2H_5$
$R'_2$ is $CH_3$ or $C_2H_5$
$R_3$ is H or an alkyl group with up to 4 carbon atoms,
$R_4$ and $R_5$ are the same or different and represent H, a lower alkyl group, preferably $CH_3$ or $C_2H_5$, or a lower acyl group, preferably acetyl, and the benzene nucleus can be further substituted in one or more places by alkyl groups with up to 4 carbon atoms; and

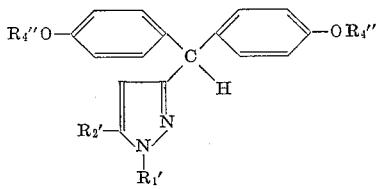

wherein $R'_1$ is $CH_3$ or $C_2H_5$
$R'_2$ is $CH_3$ or $C_2H_5$ and
$R''_4$ is H or $CH_3CO$ Particularly preferred specific compounds are:

3-(p,p'-dihydroxy-diphenylmethyl)-pyrazole
1-methyl-3-(p,p'-dihydroxy-diphenylmethyl)-pyrazole
1-ethyl-3-(p,p'-dihydroxy-diphenylmethyl)-pyrazole
1-n-propyl-3-(p,p'-dihydroxy-diphenylmethyl)-pyrazole
3-(p,p'-dihydroxy-diphenylmethyl)-5-methyl-pyrazole
3-(p,p'-dihydroxy-diphenylmethyl)-5-ethyl-pyrazole
1,5-dimethyl-3-(p,p'-dihydroxy-diphenylmethyl)-pyrazole
1-methyl-3-(p,p'-dihydroxy-diphenylmethyl)-5-ethyl-pyrazole
1-methyl-3-(p,p'-dihydroxy-diphenylmethyl)-5-n-propyl-pyrazole
1-methyl-3-(p,p'-dihydroxy-diphenylmethyl)-5-iso-propyl-pyrazole
1-methyl-3-(p,p'-dihydroxy-diphenylmethyl)-5-n-butyl-pyrazole
1-methyl-3-(p,p'-dihydroxy-diphenylmethyl)-5-isobutyl-pyrazole
1-ethyl-3-(p,p'-dihydroxy-diphenylmethyl)-5-methyl-pyrazole
1,5-diethyl-3-(p,p'-dihydroxy-diphenylmethyl)-pyrazole
1-ethyl-3-(p,p'-dihydroxy-diphenylmethyl)-5-n-propyl-pyrazole
1-ethyl-3-(p,p'-dihydroxy-diphenylmethyl)-5-isopropyl-pyrazole
1-ethyl-3-(p,p'-dihydroxy-diphenylmethyl)-5-n-butyl-pyrazole
1-ethyl-3-(p,p'-dihydroxy-diphenylmethyl)-5-isobutyl-pyrazole
1-n-propyl-3-(p,p'-dihydroxy-diphenylmethyl)-5-methyl-pyrazole
1-n-propyl-3-(p,p'-dihydroxy-diphenylmethyl)-5-ethyl-pyrazole
1-isopropyl-3-(p,p'-dihydroxy-diphenylmethyl)-5-methyl-pyrazole
1-isopropyl-3-(p,p'-dihydroxy-diphenylmethyl)-5-ethyl-pyrazole
1-n-butyl-3-(p,p'-dihydroxy-diphenylmethyl)-5-methyl-pyrazole
1-n-butyl-3-(p,p'-dihydroxy-diphenylmethyl)-5-ethyl-pyrazole
1-isobutyl-3-(p,p'-dihydroxy-diphenylmethyl)-5-methyl-pyrazole
1-isobutyl-3-(p,p'-dihydroxy-diphenylmethyl)-5-ethyl-pyrazole
1-methyl-3-(4,4'-dihydroxy-3,3'-dimethyl-diphenylmethyl)-5-ethyl-pyrazole
1-ethyl-3-(4,4'-dihydroxy-2,2'-dimethyl-diphenylmethyl)-5-methyl-pyrazole
1-methyl-3-(4,4'-dihydroxy-3,3'-diethyl-diphenylmethyl)-5-ethyl-pyrazole
1-methyl-3-(4,4'-dihydroxy-3,3'-di-n-propyl-diphenylmethyl)-5-ethyl-pyrazole
1-methyl-3-(4,4'-dihydroxy-3,3'-di-isobutyl-diphenylmethyl)-5-ethyl-pyrazole
1-methyl-3-(4,4'-dihydroxy-3,3'-dimethyl-5,5'-di-tert.butyl-diphenylmethyl)-5-ethyl-pyrazole
1-methyl-3-(4,4'-dihydroxy-3,3',5,5'-tetramethyl-diphenylmethyl)-5-ethyl-pyrazole
1-methyl-3-(4,4'-dihydroxy-2,2',3,3',5,5'-hexamethyl-diphenylmethyl)-5-ethyl-pyrazole
1-methyl-3-(4,4'-dihydroxy-2,2',6,6'-tetramethyl-diphenylmethyl)-5-ethyl-pyrazole
1-methyl-3-(4,4'-dihydroxy-2,2',3,3',5,5',6,6'-octamethyl-diphenylmethyl)-5-ethyl-pyrazole
1,1-bis-(p-hydroxyphenyl)-1-(1,5-dimethyl-pyrazolyl-3)-ethane
1,1-bis-(p-hydroxyphenyl)-1-(1,5-dimethyl-pyrazolyl-3-)-propane
1,1-bis-(p-hydroxyphenyl)-1-(1,5-dimethyl-pyrazolyl-3)-butane
1,1-bis-(p-hydroxyphenyl)-1-(1,5-dimethyl-pyrazolyl-3)-2-methyl-propane
1,1-bis-(p-hydroxyphenyl)-1-(1,5-dimethyl-pyrazolyl-3)-pentane and the diacetates, dipropionates, dibutyrates, di-isobutyrates, monomethyl and dimethyl ethers, monoethyl and diethyl ethers of these compounds.

The following are new intermediates obtained during the processes for the production of the novel pyrazole derivatives:

1-methyl-3-formyl-5-ethyl-pyrazole
1-ethyl-3-formyl-5-methyl-pyrazole
1,5-diethyl-3-formyl-pyrazole
1-methyl-3-formyl-5-n-propyl-pyrazole
1-methyl-3-formyl-5-isopropyl-pyrazole
1-isopropyl-3-formyl-5-methyl-pyrazole
1-isobutyl-3-formyl-5-methyl-pyrazole
1-methyl-3-formyl-5-isobutyl-pyrazole
1-ethyl-3-formyl-5-isobutyl-pyrazole
1-methyl-5-ethyl-pyrazole-3-carboxylic acid chloride
1-ethyl-5-methyl-pyrazole-3-carboxylic acid chloride
1,5-diethyl-pyrazole-3-carboxylic acid chloride
1-methyl-5-n-propyl-pyrazole-3-carboxylic acid chloride
1-isobutyl-5-methyl-pyrazole-3-carboxylic acid chloride
1-ethyl-5-isobutyl-pyrazole-3-carboxylic acid chloride The new novel compounds of this invention can be used in admixture with the usual pharmaceutical carriers such as those organic or inorganic substances which will not react with the new compounds, as for example gelatin, lactose, starch and magnesium stearate. The substances of this invention can be put up in any of the forms that are generally used for laxatives, e.g. dragees or suppositories. If desired, they can be combined with other therapeutic agents.

The active agents of this invention are preferably prepared in dosage units of about 5 to 15 mg. to be used once or twice daily.

The laxative effect of the new pyrazole derivatives is shown with doses considerably lower than those of the common laxative 3,3-bis-(p-acetoxyphenyl)-oxindole. Due to their low resorbance in body fluids, they exhibit a very good compatibility.

The new compounds can also be used as intermediates for the preparation of other substances.

Without further elaboration, it is believed that one skilled in the art can, using the preceding description, utilize the presented invention to its fullest extent. The following preferred specific embodiments are, therefore, to be construed as merely illustrative, and not limitative of the remainder of the specification and claims in any way whatsoever.

*Example 1*

(a) 12.5 g. 1,5-dimethyl-3-formyl-pyrazole (M.P. 57–59° C.) and 35 g. phenol are dissolved in 25 ml. glacial acetic acid and during continual stirring and cooling are added drop-by-drop at 0 to 5° C. to 16 ml. concentrated sulfuric acid for reaction therewith. The mixture is allowed to stand over night and is then poured into much water and is neutralized with soda. The precipitate which consists of 1,5-dimethyl - 3 - (p,p'-dihydroxy-diphenyl)- pyrazole is recrystallized from aqueous methanol, producing colorless crystals. M.P. 237–239° C., yield 24 g.

(b) 3 g. 1,5-dimethyl - 3 - (p,p'-dihydroxy-diphenyl-methyl)-pyrazole and 3 g. water-free sodium acetate are heated 3 hours to 100° C. in 12 ml. acetic anhydride. The mixture is then cooled and poured into water. The initially oily precipitate crystallizes upon standing, is filtered with suction, and recrystallized from alcohol. The 1,5-dimethyl-3-(p,p'-diacetoxy-diphenyl-methyl) - pyrazole thus obtained melts at 128° C., yield 3.3 g.

By analogy 1,5-dimethyl - 3 - (p,p'-dipropionyloxy-diphenyl-methyl)-pyrazole can be obtained with propionic acid anhydride, and 1,5-dimethyl-3-(p,p'-dibutyryloxy-diphenyl-methyl)-pyrazole with butyric anhydride.

Example 2

13.3 g. 1 - ethyl - 3 - formyl - 5 - methyl - pyrazole (B.P.$_{8 mm. Hg}$ 112–114° C.) and 32 g. phenol are dissolved in 20 ml. glacial acetic acid and with stirring and cooling are reacted with 16 ml. concentrated sulfuric acid. The product is worked up as under Example 1(a). The yield is 28 g. colorless crystals, M.P. 240° C. The diacetate of the 1-ethyl - 3 - (p,p'-dihydroxy-diphenyl-methyl)-5-methyl-pyrazole melts at 128° C.

By analogy, 1 - ethyl - 3 - (p,p'-dihydroxy-diphenyl-methyl)-5-isobutyl-pyrazole, M.P. 221° C., is obtained from 1-ethyl-3-formyl-5-isobutyl-pyrazole.

Example 3

As in Example 2, 13.8 g. 1-methyl-3-formyl-5-ethyl-pyrazole (B.P.$_{10 mm. Hg}$ 128–130° C.) and 32 g. phenol in 20 ml. glacial acetic acid and 16 ml. concentrated sulfuric acid are reacted to produce 1-methyl-3-(p,p'-dihydroxy-diphenyl-methyl)-5-ethyl-pyrazole. The yield is 28.5 g. colorless crystals, M.P. 198° C. The diacetate melts at 111° C. and the dipropionate at 91° C.

Example 4

1,5-diethyl - 3 - (p,p'-dihydroxy-diphenyl-methyl-pyrazole is produced as in Example 1(a) from 15.2 g. 1,5-diethyl-3-formylpyrazole (B.P.$_{10}$ 126–128° C.) and 36 g. phenol in 25 ml. glacial acetic acid and 18 ml. concentrated sulfuric acid. The yield is 30 g. colorless crystals, M.P. 208° C. The diacetate melts at 112° C.

By analogy there can be produced from the 5-substituted 1-ethyl-3-formyl-pyrazoles:

1-ethyl-3-(p,p'-dihydroxy-diphenyl-methyl)
5-pyropyl, 5-isopropyl or 5-butyl pyrazole and the corresponding diacetates.

Example 5

As in Example 1(a), 15.2 g. 1-methyl-3-formyl-5-n-propyl-pyrazole (B.P.$_{8}$ 136–138° C.) and 36 g. phenol in 25 ml. glacial acetic acid and 18 ml. concentrated sulfuric acid are reacted to produce 1-methyl-3-(p,p'-dihydroxy-diphenyl-methyl)-5-n-propyl-pyrazole. Yield 28 g. The product melts at 219° C. and the diacetate at 110° C.

Example 6

By analogy to Example 5, 1-methyl-3-formyl-5-isopropyl-pyrazole (B.P.$_{9}$ 130–132° C.) is converted into 1-methyl-3-(p,p'-dihydroxy-diphenyl - methyl)-5-isopropyl-pyrazole. Yield 30 g. M.P. 235° C. The diacetate melts at 113° C.

Example 7

By analogy to Examples 5 and 6, 1-iso-propyl-3-formyl-5-methyl-pyrazole (B.P.$_{8}$ 114–116° C.) is converted into 1 - isopropyl - 3 - (p,p' - dihydroxy-diphenyl-methyl)-5-methyl-pyrazole. Yield 27 g. The product melts at 225° C. and the diacetate at 116° C.

Example 8

By analogy to Example 1(a), 16 g. 1-isobutyl-3-formyl-5- methyl-pyrazole (B.P.$_{10}$ 140–142° C.) and 32 g. phenol in 25 ml. glacial acetic acid and 16 ml. concentrated sulfuric acid are reacted to produce 1-isobutyl-3-(p,p'-dihydroxy-diphenyl-methyl)-5-methyl-pyrazole. Yield 29 g. The product melts at 205° C. and the diacetate at 105° C.

Example 9

By analogy to Example 8, 1-methyl-3-formyl-5-isobutyl-pyrazole (B.P.$_{13}$ 147–150° C.) is converted into 1-methyl-3-(p,p'-dihydroxy-diphenyl-methyl)-5-isobutyl - pyrazole. Yield 31 g. The product melts at 214° C. and the diacetate at 94° C.

Example 10

By analogy to Example 1(a), 13.8 g. 1-methyl-3-formyl-5-ethyl pyrazole and 40 g. o-cresol in 20 ml. glacial acetic acid and 16 ml. concentrated sulfuric acid are reacted to produce 1-methyl-3-(4,4'-dihydroxy-3,3'-dimethyl-diphenyl-methyl)-5-ethyl-pyrazole. Yield 35 g. The product melts at 170° C. and the diacetate at 158° C.

Example 11

By analogy to Example 1(a), 13.8 g. 1-ethyl-3-formyl-5-methyl-pyrazole and 40 g. m-cresol in 20 ml. glacial acetic acid and 16 ml. concentrated sulfuric acid are reacted to produce 1-ethyl-3-(4,4'-dihydroxy-2,2'-dimethyl-diphenyl-methyl)-5-methyl-pyrazole. Yield 29 g. The product melts at 215° C. and the diacetate at 171° C.

Example 12

By analogy to Example 1(a), 13.8 g. 1-methyl-3-formyl-5-ethyl-pyrazole, 50 g. 2-methyl-6-tert.butyl-phenol in 10 ml. glacial acetic acid and 16 ml. concentrated sulfuric acid are reacted to produce 1-methyl-3-(4,4'-dihydroxy-3,3' - dimethyl - 5,5' - di-tert.butyl - diphenyl - methyl) - 5-ethyl-pyrazole. Yield 12 g. The product melts at 230° C.

Example 13

13.8 g. 1,5-dimethyl-3-acetyl-pyrazole (M.P. 57°) and 35 g. phenol are dissolved in a small quantity of glacial acetic acid and then reacted with 16 ml. concentrated sulfuric acid during stirring and cooling. The mixture is allowed to stand 2 days at room temperature and is then poured into water and neutralized with soda. The precipitated, 1,1-bis-(p-hydroxyphenyl)-1-(1,5-dimethyl-pyrazolyl-3)-ethane after a few hours is filtered with suction. Colorless crystals are obtained from ethanol-water. M.P. 254° C. Yield 28 g. Diacetate M.P. 130° C.

By analogy there can be obtained the following:

From 1,5-dimethyl-3-propionyl-pyrazole produced from 1,5-dimethyl-3-cyano-pyrazole and ethyl-magnesium-bromide, the 1,1-bis-(p-hydroxy-phenyl)-1-(1,5-dimethyl-pyrazole-3)-propane;

From 1,5-dimethyl-3-butyryl-pyrazole (produced from 1,5-dimethyl-3-cyano-pyrazole and propyl-magnesium-bromide) the 1,1-bis-(p-hydroxyphenyl)-1-(1,5-dimethyl-pyrazole-3)-butane; and From 1-ethyl-5-methyl-3-valeryl-pyrazole (produced from 1-ethyl-3-cyano-5-methyl-pyrazole and lithium-butyl), the 1,1-bis-(p-hydroxy-phenyl)-1-(1-ethyl-5-methyl-pyrazole-3)-pentane.

Example 14

2.72 g. 1-methyl-5-ethyl-pyrazole-3-aldehyde-azine (M.P. 184° C.) are mixed with 4 g. phenol and during stirring and cooling are reacted drop-by-drop with 3 ml. 70% sulfuric acid. The mixture is left standing overnight. It is then poured into ice water, neutralized with soda, and filtered with suction. The yield is 5.6 g. 1-methyl-3-(p,p'-dihydroxy-diphenyl-methyl)-5-ethyl-pyrazole. M.P. 198° C. The diacetate melts at 111° C.

Example 15

19.5 g. 1-ethyl-3-formyl-5-methyl-pyrazole-semicarbazone (M.P. 212° C.) are mixed with 32 g. phenol and then reacted with 30 ml., 80% sulfuric acid during stirring and cooling. The mixture is left standing 3 days at 60° C. It is then poured into ice water and neutralized with soda. The precipitated 1-ethyl-3-(p,p'-dihydroxy-diphenyl-methyl)-5-methyl-pyrazole is filtered with suction. After recrystallization from alcohol, the product melts at 240° C. Yield 24 g. The diacetate melts at 128° C.

Example 16

From 1.38 g. 1-ethyl-3-formyl-5-methyl-pyrazole, the bisulfite compound thereof is produced. This is thoroughly mixed with 3.2 g. phenol and 2 ml. glacial acetic acid. 1.6 ml. concentrated sulfuric acid are then added drop-by-drop with stirring and cooling. The mixture is then left standing overnight, is poured into water, and after being neutralized with soda, is filtered with suction. The yield is 2.3 g. 1-ethyl-3-(p,p'-dihydroxy-diphenyl-methyl)-5-methyl-pyrazole. M.P. 240° C. The diacetate melts at 128° C.

Example 17

18 g. 1,5-dimethyl-3-dichloromethyl-pyrazole (M.P. 91°) are finely pulverized and mixed with 50 g. phenol. To the mixture are added 3 drops of boron trifluoride etherate while it is warmed 4 hours to 70° C. and traversed by a current of nitrogen. The excess phenol is then distilled off with steam. The remaining aqueous solution is neutralized with soda and is then extracted with ether. After evaporation of the ether, 21 g. 1,5-dimethyl-3-(p,p'-dihydroxy-diphenyl-methyl)-pyrazole are obtained. M.P. 239° C. The diacetate melts at 128° C.

Example 18

2.32 g. (1,5-dimethyl-pyrazole-3)-p-methoxyphenyl-carbinol (produced by Friedel-Crafts reaction of 1,5-dimethyl-pyrazole-3-carboxylic-acid-chloride with anisole and subsequent hydrogenation of the ketone thus obtained, M.P. 129° C.), are reacted with 4 g. anisole and 1.5 ml. glacial acetic acid. 3 ml. concentrated sulfuric acid are then added drop-by-drop with stirring and cooling. The mixture is left standing overnight, is then poured into ice water, and is neutralized with soda. The excess anisole is driven off with steam. It is then extracted with ether, yielding 2.2 g. 1,5-dimethyl-3-(p,p'-dimethoxy-diphenyl-methyl)-pyrazole, melting at 83° C.

Example 19

2.32 g. (1,5-dimethyl-pyrazole-3)-(p-methoxyphenyl)-carbinol and 4 g. o-cresol are dissolved in 3 ml. glacial acetic acid. 3 ml. concentrated hydrochloric acid are then added drop-by-drop at 5 to 10° C. with stirring. The mixture is left standing overnight and is then poured into ice water and is neutralized with soda. The yield is 2.5 g. 1,5-dimethyl - 3 - (4 - hydroxy - 3 - methyl - 4' - methoxy - diphenyl-methyl)-pyrazole. After recrystallization from alcohol, it melts at 178° C.

Example 20

3.3 g. (1,5-dimethyl-pyrazolyl-3)-di-(p-methoxy-phenyl)-carbinol are dissolved in 200 ml. absolute alcohol and in the presence of 2 g. 5% palladium carbon are thoroughly hydrogenated at 60° C. under 8 atm. The catalyst is then filtered off and the solvent evaporated, leaving 2.25 g. 1,5-dimethyl-3-(p,p'-dimethoxy-diphenyl-methyl)-pyrazole. M.P. 83° C.

By analogy there is produced by hydrogenation of 1-(1, 5 - dimethyl - pyrazolyl - 3) - 1,1 - bis - (p - methoxy-phenyl)-butene-3 (produced by reaction of 1,5-dimethyl-3-cyano-pyrazole with allyl magnesium bromide, followed by condensation with anisole), the 1-(1,5-dimethyl-pyrazolyl-3-)-1,1-bis-(p-methoxyphenyl)-butane.

Example 21

2.9 g. 1,5-dimethyl-3-(p,p'-diamino-diphenyl-methyl)-pyrazole (M.P. 158°) are dissolved in 75 ml. 25% sulfuric acid. To the boiling solution there is slowly added during stirring 25 ml. of a 10% sodium nitrite solution. The mixture is boiled one hour and is then cooled. It is treated with charcoal to remove resinous impurities, is filtered, and the clear solution neutralized with soda. The precipitate is extracted with ether. The residue from the ether extract, consisting of 1 g. 1,5-dimethyl-3-(p,p'-dihydroxy-diphenyl-methyl)-pyrazole is recrystallized from methanol-water and melts at 239° C.

Example 22

3.0 g. 1 - methyl - 3-(p-p'-diamino-diphenyl-methyl)-5-ethyl-pyrazole are dissolved in 75 ml. 20% sulfuric acid and during stirring are reacted with 20 ml. of a 10% solution of sodium nitrite. The mixture is then heated 1 hour over a boiling water bath, and after cooling and treating with charcoal is filtered and neutralized with soda. The precipitate is extracted with ether. From the extract are obtained 1.6 g. 1-methyl-3-(p,p'-dihydroxy-diphenyl-methyl)-5-ethyl-pyrazole. M.P. 198° C. (from alcohol).

Example 23

3.2 g. 1,5 - diethyl - 3-(p,p'-diamino-diphenyl-methyl)-pyrazole are dissolved in 75 ml. 20% sulfuric acid. While it is being stirred and cooled, 20 ml. of a 10% sodium nitrite solution are slowly added, and the mixture is then warmed one hour over a water bath. The solution, after cooling, is clarified with charcoal, neutralized with soda, and extracted with ether. From the ether extract are obtained 1.8 g. 1,5 - diethyl - 3 - (p,p'-dihydroxy-diphenyl-methyl)-pyrazole. M.P. 208° (from alcohol).

Example 24

3 g. 1,5 - dimethyl - 3 - (p-amino-p'-methoxy-diphenyl-methyl)-pyrazole (M.P. 217° C.) are dissolved in 50 ml. 10% sulfuric acid. While the solution is being stirred, 12 ml. of a 10% sodium nitrite solution are slowly added, after which the solution is warmed 1 hour over a boiling water bath. The cooled solution is then treated with charcoal, neutralized with soda, and extracted with ether. The yield is 1.6 g. 1,5-dimethyl-3-(p-hydroxy-p'-methoxy-diphenyl-methyl)-pyrazole. M.P. 197° C. (from alcohol).

Example 25

2.9 g. 1,5 - dimethyl - 3-(p-amino-p'-hydroxy-diphenyl-methyl)-pyrazole are dissolved in 50 ml. 10% sulfuric acid and during stirring are reacted with 12 ml. of a 10% sodium nitrite solution. After warming one hour over a water bath and treatment with charcoal the solution is filtered, neutralized with soda, and extracted with ether. From the extract are obtained 1.3 g. 1,5-dimethyl-3-(p,p'-dihydroxy-diphenyl - methyl) - pyrazole M.P. 239° (from methanol-water).

Example 26

3.2 g. 1,5 - dimethyl - 3-(4-amino-3-methyl-4'-methoxy-diphenyl-methyl)-pyrazole are dissolved in 50 ml. 10% sulfuric acid and slowly reacted during stirring with a 10% sodium nitrite solution. After being warmed one hour on a water bath, the mixture is clarified with charcoal, neutralized with soda, and extracted with ether. The yield is 1.4 g. 1,5-dimethyl - 3 - (4-hydroxy-3-methyl-4'-methoxy-diphenyl-methyl)-pyrazole. M.P. 178° (from alcohol).

Example 27

1.25 g. 1,5-dimethyl-3-formyl-pyrazole are reacted with 4.4 g. anisole to produce 1,5-dimethyl-3-(p,p'-dimethoxy-diphenyl-methyl)-pyrazole, M.P. 83° C., by analogy to Example 1(a).

If by analogy, phenetol is used instead of anisole, 1,5-dimethyl-3-(p,p'-diethoxy-diphenyl-methyl) - pyrazole is obtained. If phenyl-n-butyl-ether is used instead of anisole, 1,5 - dimethyl-3-(p,p'-di-n-butoxy-diphenyl-methyl)-pyrazole is obtained.

By analogy, from 1,5-diethyl-3-acetyl-pyrazole and anisole, there is obtained 1 - (1,5 - diethyl-pyrazolyl-3) - 1,1-bis-(p-methoxy-phenyl)-ethane.

Example 28

1 g. 1-ethyl - 3 - (p,p' - dihydroxy-diphenyl-methyl)-5-methyl-pyrazole is dissolved in 10 ml. 2 N NaOH solution and is reacted with 2 g. dimethyl sulfate. The mixture is warmed 30 minutes on a steam bath, and after being cooled it is extracted with ether. After drying and evaporating down, 0.8 g. 1-ethyl-5-methyl-3-(p,p'-dimethoxy-diphenyl-methyl)-pyrazole is obtained.

Example 29

1 g. 1-ethyl - 5 - methyl - 3 - (p,p'-diacetoxy-diphenyl-methyl)-pyrazole is boiled 30 minutes with 20 ml. 1 N NaOH solution. After neutralization with dilute HCl the precipitated 1 - ethyl-3-(p,p'-dihydroxy-diphenyl-methyl)-5-methyl-pyrazole is filtered with suction and recrystallized from aqueous methanol. M.P. 240° C.

Example 30

2 g. 1,5-dimethyl-3-(p,p'-dimethoxy-diphenyl-methyl)-pyrazole are heated one hour to 210° C. with 5 g. freshly distilled pyridine hydrochloride. After cooling the mixture and adding 30 ml. water, the precipitated 1,5-dimethyl-3-(p,p'-dihydroxy-diphenyl-methyl)-pyrazole is recrystallized from methanol. M.P. 237–239° C. Yield 1.2 g.

Example 31

2.3 g. pyrazolyl-(3)-(p-methoxy-phenyl)-carbinol [produced by reaction of anisaldehyde with acetylene to 1-(p-methoxy-phenyl)-propyne-2-ol-1, oxidation to 1-(p-methoxy-phenyl)-propyne-2-one-1, reaction with diazomethane to 3-(p-methoxy-benzyl)-pyrazole, and hydrogenation by platinum oxide] and 3.5 g. phenol are dissolved in 5 ml. acetic acid and reacted with 3 ml. concentrated sulfuric acid at 0 to 10° C. After standing 12 hours it is poured into water and neutralized with sodium carbonate. After triturating the precipitate with methanol, it crystallizes out as 3-(p-hydroxy-p'-methoxy-diphenyl-methyl)-pyrazole. M.P. 176° C.

The following examples are such for typical pharmaceutical preparations of the new compounds.

Example A.—Coated tablets

Each coated tablet contains:

| | Mg. |
|---|---|
| 1-ethyl-3-(p,p'-diacetoxy-diphenylmethyl)-5-methyl pyrazole | 15 |
| Lactose | 80 |
| Corn starch | 22 |
| Talc | 3 |

The coating is a mixture of corn starch, sugar, talc and tragacanth.

Example B.—Suppositories

Each suppository contains:

| | Mg. |
|---|---|
| 1-methyl-3-(p,p'-diacetoxy-diphenylmethyl)-5-ethyl-pyrazole | 15 |
| Triglycerides of $C_{11}$–$C_{17}$ saturated fatty acids | 1985 |

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and intended to be, within the full range of equivalence of the following claims.

What is claimed is:
1. A compound of the formula

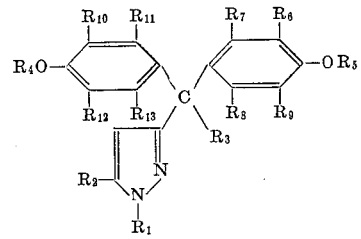

wherein
$R_1$, $R_2$ and $R_3$ are each selected from the group consisting of hydrogen and alkyl of 1–4 carbon atoms;
$R_4$ and $R_5$ are each selected from the group consisting of hydrogen, lower alkyl, and lower alkanoyl, and
$R_6$, $R_7$, $R_8$, $R_9$, $R_{10}$, $R_{11}$, $R_{12}$ and $R_{13}$ are each selected from the group consisting of hydrogen and alkyl of 1–4 carbon atoms.

2. 1,5-dimethyl - 3 - (p,p'-dihydroxy-diphenyl-methyl)-pyrazole.
3. 1-methyl-3-(p,p'-dihydroxy - diphenyl - methyl) - 5-ethyl-pyrazole.
4. 1 - ethyl - 3 - (p,p' - dihydroxy-diphenyl-methyl)-5-methyl-pyrazole.
5. 1,5-diethyl-3-(p,p' - dihydroxy - diphenyl - methyl)-pyrazole.
6. 1 - methyl-3-(p,p'-dihydroxy-diphenyl-methyl)-5-n-propyl-pyrazole.
7. 1-methyl-3-(p,p'-dihydroxy-diphenyl - methyl) - 5-isopropyl-pyrazole.
8. 1 - methyl - 3-(p,p'-dihydroxy-diphenyl-methyl)-5-isobutyl-pyrazole.
9. 1 - isopropyl-3-(p,p'-dihydroxy-diphenyl-methyl)-5-methyl-pyrazole.
10. 1 - isobutyl-3-(p,p'-dihydroxy-diphenyl-methyl)-5-methyl-pyrazole.
11. 1,5 - dimethyl-3-(p,p'-diacetoxy-diphenyl-methyl)-pyrazole.
12. 1 - methyl - 3 - (p,p'-diacetoxy-diphenyl-methyl)-5-ethyl-pyrazole.
13. 1 - ethyl - 3 - (p,p' - diacetoxy-diphenyl-methyl)-5-methyl-pyrazole.
14. 1,5-diethyl - 3 - (p,p'-diacetoxy-diphenyl-methyl)-pyrazole.
15. 1 - methyl-3-(p,p'-diacetoxy-diphenyl-methyl)-5-n-propyl-pyrazole.
16. 1-methyl-3-(p,p'-diacetoxy-diphenyl - methyl) - 5-isopropyl-pyrazole.
17. 1 - methyl - 3-(p,p'-diacetoxy-diphenyl-methyl)-5-isobutyl-pyrazole.
18. 1 - isopropyl-3-(p,p'-diacetoxy-diphenyl-methyl)-5-methyl-pyrazole.
19. 1 - isobutyl-3-(p,p'-diacetoxy-diphenyl-methyl)-5-methyl-pyrazole.

References Cited

UNITED STATES PATENTS 2,721,143  10/1955  Kraft et al. _____ 260—310

OTHER REFERENCES

Grinsteins et al.: Chem Abst., vol. 58, columns 3364–5 (1963).

Light et al.: Chem. Abst., vol. 55, columns 23420–2 (1961).

WALTER A. MODANCE, *Primary Examiner.*

NATALIE TROUSOF, *Assistant Examiner.*